(12) United States Patent
Dutu et al.

(10) Patent No.: US 11,809,902 B2
(45) Date of Patent: Nov. 7, 2023

(54) FINE-GRAINED CONDITIONAL DISPATCHING

(71) Applicant: Advanced Micro Devices, Inc., Santa Clara, CA (US)

(72) Inventors: Alexandru Dutu, Bellevue, WA (US); Marcus Nathaniel Chow, San Diego, CA (US); Matthew D. Sinclair, Bellevue, WA (US); Bradford M. Beckmann, Bellevue, WA (US); David A. Wood, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 381 days.

(21) Appl. No.: 17/031,424

(22) Filed: Sep. 24, 2020

(65) Prior Publication Data

US 2022/0091880 A1    Mar. 24, 2022

(51) Int. Cl.
*G06F 9/48* (2006.01)
*G06F 9/54* (2006.01)
*G06F 9/38* (2018.01)

(52) U.S. Cl.
CPC .......... *G06F 9/4881* (2013.01); *G06F 9/3838* (2013.01); *G06F 9/545* (2013.01)

(58) Field of Classification Search
CPC ....... G06F 9/4881; G06F 9/3838; G06F 9/545
See application file for complete search history.

(56) References Cited

U.S. PATENT DOCUMENTS

| | | | | |
|---|---|---|---|---|
| 2012/0320070 | A1* | 12/2012 | Arvo | G06F 9/5033 345/522 |
| 2013/0332937 | A1* | 12/2013 | Gaster | G06F 9/5072 718/104 |
| 2016/0335143 | A1* | 11/2016 | Sen | G06F 9/4893 |
| 2017/0083326 | A1* | 3/2017 | Burger | G06F 12/0862 |
| 2018/0349145 | A1* | 12/2018 | Tye | G06F 9/3877 |

OTHER PUBLICATIONS

Richards, D., et. al. "Quicksilver," [Online]. 2016. Computer Software, Available: https://www.osti.gov/biblio/1313660.
US Doe, "Quicksilver." [Online]. Computer Software, Available: https://computing.llnl.gov/projects/co-design/quicksilver.
Helal, A. E., et. al. "Adaptive Task Aggregation for High-Performance Sparse Solvers on GPUs", 28th International Conference on Parallel Architectures and Compilation Techniques, 13 pgs., Sep. 2019.

(Continued)

*Primary Examiner* — Wissam Rashid
(74) *Attorney, Agent, or Firm* — Volpe Koenig (57) ABSTRACT

Techniques for executing workgroups are provided. The techniques include executing, for a first workgroup of a first kernel dispatch, a workgroup dependency instruction that includes an indication to prioritize execution of a second workgroup of a second kernel dispatch, and in response to the workgroup dependency instruction, dispatching the second workgroup of the second kernel dispatch prior to dispatching a third workgroup of the second kernel dispatch, wherein no workgroup dependency instruction including an indication to prioritize execution of the third workgroup has been executed.

16 Claims, 7 Drawing Sheets

(56) References Cited

OTHER PUBLICATIONS

Orr, M.S., et. al., "Gravel: Fine-grain GPU-initiated Network Messages", SC'17: Proceedings of the International Conference for High Performance Computing, Networking, Storage and Analysis, Article No. 23, 12 pgs., Nov. 2017.

Orr, M. S., et. al. "Fine-grain Task Aggregation and Coordination on GPUs", ACM/IEEE 41st International Symposium on Computer Architecture, 12 pgs., 2014.

Liu, J., "Efficient Synchronization for GPGPU", University of Pittsburg Swanson School of Engineering Dissertation Presentation, 128 pgs., Jun. 12, 2018.

Huss-Lederman, S., et. al., "Implementation of Strassen's Algorithm for Matrix Multiplication", Proceedings of the ACM/IEEE Conference on Supercomputing, 27 pgs., Aug. 1996.

Huang, J., et. al., "Implementing Strassen's Algorithm with CUT-LASS on NVIDIA Volta GPUs", arXiv: 1808.07984v1, arXiv, 22 pgs., Aug. 2018.

Parker, S. G., et. al., "OptiX: A general purpose ray tracing engine", ACM Transactions on Graphics, vol. 29, No. 4, Article 66, 13 pgs., Jul. 2010.

Keller, A., et. al., "The Iray Light Transport Simulation and Rendering System", arXiv:1705.01263v1, arXiv, 49 pgs., May 2017.

Orr, M. S., et. al., "Synchronization Using Remote-Scope Promotion", ASPLOS, vol. 1., 14 pgs., Mar. 2015.

\* cited by examiner

FINE-GRAINED CONDITIONAL DISPATCHING

STATEMENT REGARDING GOVERNMENT SUPPORT

This invention was made with Government support under PathForward Project with Lawrence Livermore National Security (Prime Contract No. DE-AC52-07NA27344, Subcontract No. B620717) awarded by DOE. The Government has certain rights in this invention.

BACKGROUND

In general purpose highly parallel computing, a large number of instances of individual programs are executed in parallel. Due to the complexity of such a mode of execution, performance improvements are constantly being made.

BRIEF DESCRIPTION OF THE DRAWINGS

A more detailed understanding can be had from the following description, given by way of example in conjunction with the accompanying drawings wherein.

DETAILED DESCRIPTION

Techniques for executing workgroups are provided. The techniques include executing, for a first workgroup of a first kernel dispatch, a workgroup dependency instruction that includes an indication to prioritize execution of a second workgroup of a second kernel dispatch; and in response to the workgroup dependency instruction, dispatching the second workgroup of the second kernel dispatch prior to dispatching a third workgroup of the second kernel dispatch, wherein no workgroup dependency instruction including an indication to prioritize execution of the third workgroup has been executed.

Figure 1:
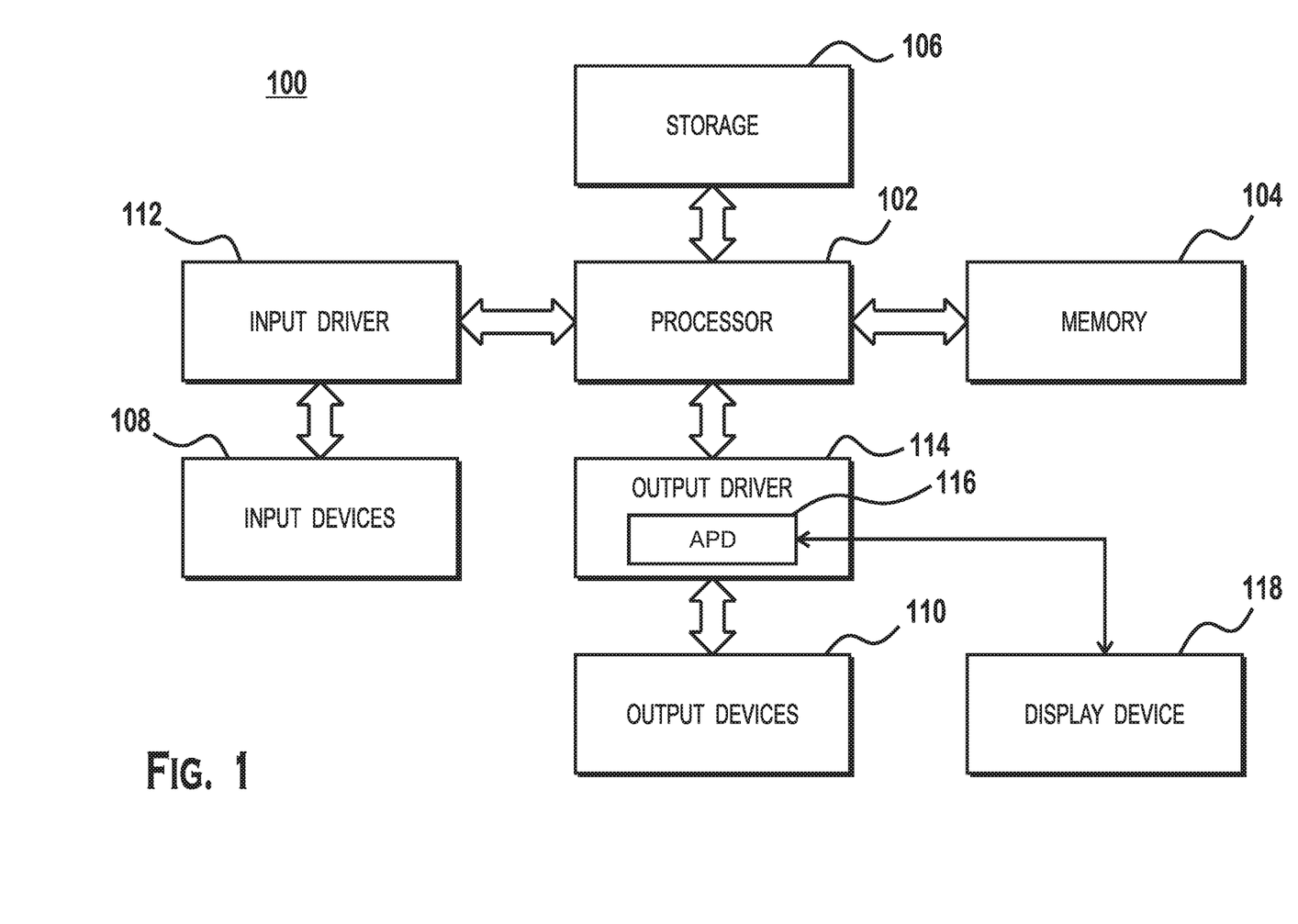
FIG. 1 is a block diagram of an example device in which one or more features of the disclosure can be implemented.

FIG. 1 is a block diagram of an example device 100 in which one or more features of the disclosure can be implemented. The device 100 could be one of, but is not limited to, for example, a computer, a gaming device, a handheld device, a set-top box, a television, a mobile phone, a tablet computer, or other computing device. The device 100 includes a processor 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices (e.g., controlling operation, receiving inputs from, and providing data to output drivers 114). It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a display device 118, which, in some examples, is a physical display device or a simulated device that uses a remote display protocol to show output. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
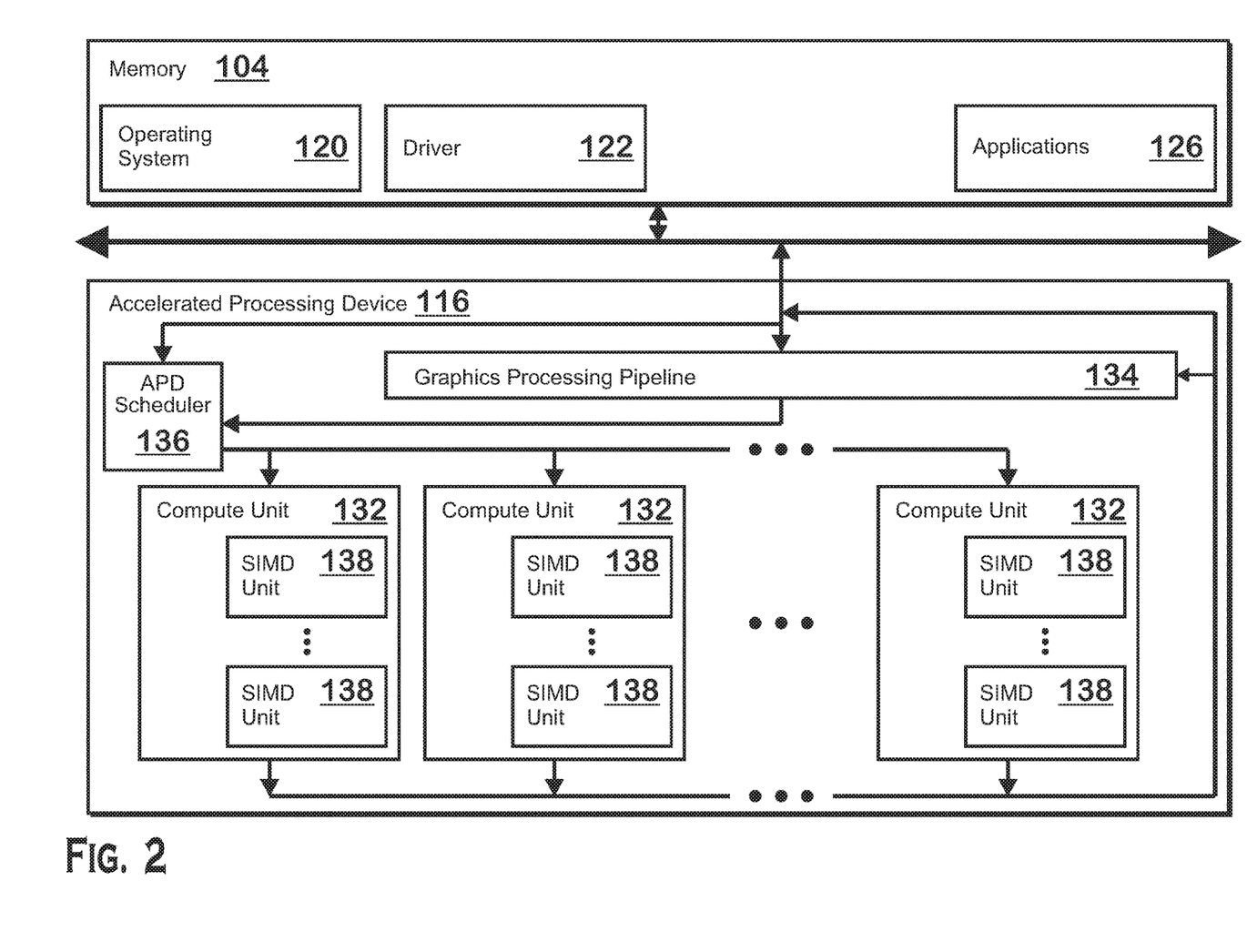
FIG. 2 illustrates details of the device of FIG. 1, according to an example.

FIG. 2 illustrates details of the device 100 and the APD 116, according to an example. The processor 102 (FIG. 1) executes an operating system 120, a driver 122, and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102. In some examples, these compute processing operations are performed by executing compute shaders on the SIMD units 138.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. An APD command processor 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
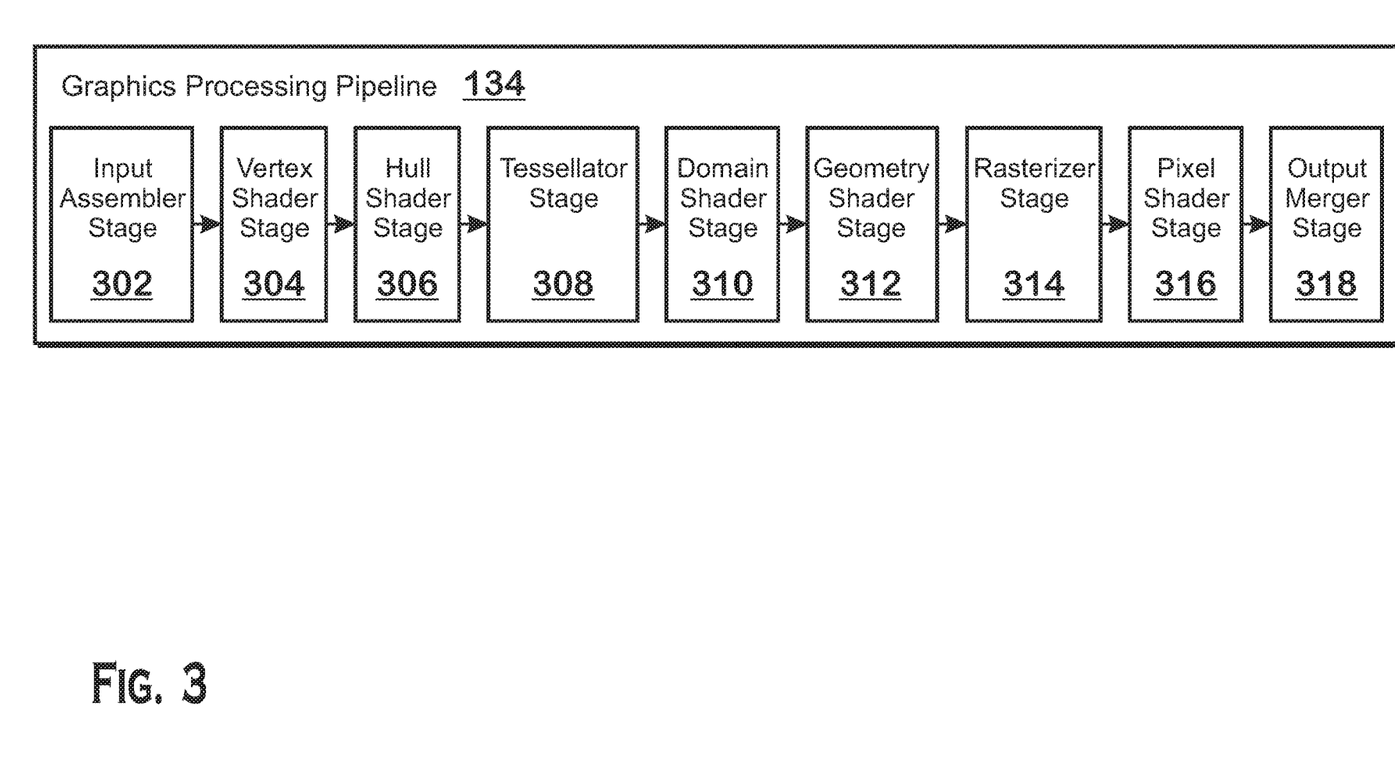
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132 that are compiled by the driver 122 as with the vertex shader stage 304.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. In some instances, a geometry shader program that is compiled by the driver 122 and that executes on the compute units 132 performs operations for the geometry shader stage 312.

The rasterizer stage 314 accepts and rasterizes simple primitives (triangles) generated upstream from the rasterizer stage 314. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a pixel shader program that is compiled by the driver 122 and that executes on the compute units 132.

The output merger stage 318 accepts output from the pixel shader stage 316 and merges those outputs into a frame buffer, performing operations such as z-testing and alpha blending to determine the final color for the screen pixels.

An implementation of an APD 116 is disclosed that includes a graphics processing pipeline 134 and that is capable of performing graphics rendering. However, the teachings of the present disclosure extend to implementations of the APD 116 that do not include a graphics processing pipeline 134 and thus do not perform graphics rendering utilizing such a pipeline.

The APD 116 executes compute shader programs (also referred to as "kernels" herein) to perform general purpose compute operations. One or more software or hardware entities ("a host") such as an application 126 requests that the APD 116 perform compute shader programs by transmitting one or more kernel dispatch packets to the APD 116 for processing. The kernel dispatch packet specifies information such as size (number of work-items) of the kernel dispatch and the binary that defines the compute shader program requested to be executed. Each kernel dispatch packet is associated with a particular kernel "instance," where the term "instance" is used to refer to a particular execution of a compute shader program, launched with a particular group of settings such as size, input specifications, or other items.

As described above, a kernel dispatch packet specifies a number of workgroups with which to execute the kernel. The APD scheduler 136 processes these packets by scheduling workgroups of the kernel dispatch packet for execution on the compute units 132.

The APD scheduler 136 uses a particular scheduling policy to determine the order in which to dispatch workgroups for a particular kernel dispatch. The term "dispatch," when applied to workgroups, means permitting execution of the workgroup to begin. In an example, the APD scheduler 136 dispatches a workgroup to a compute unit 132 and the compute units 132 is then permitted to begin executing that workgroup. In some implementations, compute units 132 each have schedulers that control the timing of execution of workgroups and wavefronts on those compute units 132. Thus, in some implementations, once a workgroup is dispatched to a compute unit 132, the scheduler of the compute unit 132 does not necessarily execute that workgroup immediately. Instead, the scheduler of the compute unit 132 determines times to execute the workgroup based on a scheduling policy that, in various implementations, takes into account the various resources that are available on the compute unit 132, the numbers and requirements of the workgroups currently assigned to the compute units 132, and, in some implementations, other factors. Before being dispatched, however, a workgroup is unable to execute on a compute unit 132.

In some modes of operations, the APD scheduler 136 dispatches such workgroups in a "simple" order such as in workgroup-identifier ("workgroup-ID") numerical order. More specifically, each workgroup of a kernel dispatch has a workgroup ID. In some implementations, the workgroup IDs within a single kernel dispatch increase from 0 to the highest numbered workgroup (which is, for example, defined by kernel dispatch size). In some modes of operation, the APD scheduler 136 dispatches workgroups in the numerical order corresponding to the workgroup ID.

In many situations, however, it is possible for the "simple" order described above to lead to efficiencies. More specifically, it is possible for a particular workgroup of a first kernel dispatch to produce data that is consumed by a particular workgroup of a second kernel dispatch. In some situations, however, many workgroups other than the particular workgroup of the second kernel are dispatched before the particular workgroup. In the situation where many workgroups in the second kernel dispatch are waiting for data from many other workgroups of the first kernel dispatch, and the IDs of the workgroups in the second kernel dispatch do not correspond to the IDs of the workgroups that produce corresponding output data of the first kernel dispatch, the ID-ordered scheduling of workgroups leads to inefficiencies.

Figure 4A:
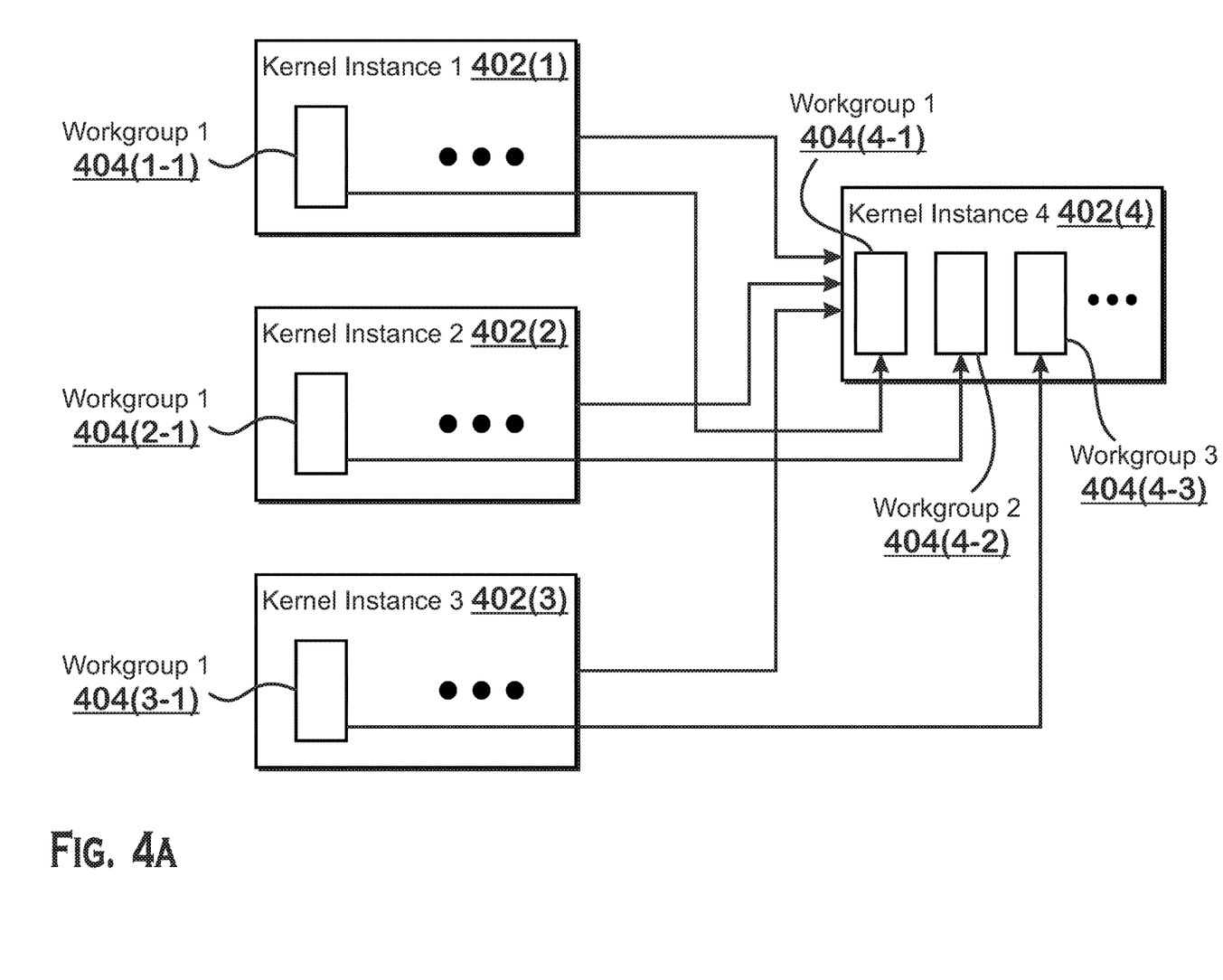
FIG. 4A illustrates dependencies between workgroups of different kernel instances, to illustrate some aspects of dispatching workgroups of different kernel instances, according to an example.

FIG. 4A illustrates dependencies between workgroups 404 of different kernel instances 402, to illustrate some aspects of dispatching workgroups of different kernel instances, according to an example. Four kernel instances are shown—kernel instance 1 402(1), kernel instance 2 402(2), and kernel instance 3 402(3). Workgroup 1 of each kernel instance 402 is illustrated. The ellipsis in kernel instance 1 402(1), kernel instance 2 402(2) and kernel instance 3 402(3) indicates that those kernel instances include additional workgroups 404 not illustrated.

Kernel instance 4 402(4) is dependent on each of kernel instance 1 402(1), kernel instance 2 402(2), and kernel instance 3 402(3). Specifically, workgroup 1 404(4-1) of kernel instance 4 402(4) consumes data generated by workgroup 1 404(1-1) of kernel instance 1 402(1), workgroup 2 404(4-2) of kernel instance 4 402(4) consumes data generated by workgroup 1 404(2-1) of kernel instance 2 402(2) and workgroup 3 404(4-3) of kernel instance 4 402(4) consumes data generated by workgroup 1 404(3-1) of kernel instance 3 402(3).

In the "simple" workgroup dispatch ordering described above, it would be possible for the APD scheduler 136 to dispatch workgroup 1 404(4-1) while the data for that workgroup 404 (i.e., generated by workgroup 1 404(1-1) of kernel instance 1 402(1)) is not yet available. In the example where the simple ordering involves dispatching workgroups in numerical order, the APD scheduler 136 would dispatch workgroup 1 404(4-1) of kernel instance 4 402(4) before the other workgroups 404 of kernel instance 4 402(4). However, if workgroup 1 404(1-1) had not yet produced output data, then workgroup 1 404(4-1) would have to wait for that data to become available. Thus, in this example, a workgroup 404 would be dispatched while that workgroup 404 is ultimately unable to proceed with execution.

In addition, it is possible that workgroup 1 404(3-1) completes execution substantially before workgroup 1 404 (1-1) and workgroup 1 404(2-1) complete execution. However, with the simple ordering of workgroup dispatch, the APD scheduler 136 would dispatch workgroup 1 404(4-1) and workgroup 2 404(4-2) before workgroup 3 404(4-3), which would lead to inefficiencies. For example, workgroup 1 404(4-1) and workgroup 2 404(4-2) could execute too early and workgroup 3 404(4-3) could execute too late.

It is also possible to use a kernel-level barrier to ensure that kernel instances 402 that have dependencies wait to begin execution until all kernel instances 402 that satisfy those dependencies have completely executed. In the example of FIG. 4A, using a kernel level barrier immediately before kernel instance 4 402(4), the APD scheduler 136 would dispatch no workgroup 404 of kernel instance 4 402(4) until all workgroups of kernel instance 1 402(1), kernel instance 2 402(2), and kernel instance 402(3) have completed. However, in this scenario, no workgroup 404 of kernel instance 4 402(4) would be able to execute until all workgroups 404 of kernel instance 1 402(1), kernel instance 2 402(2), and kernel instance 402(3) were complete, even if a workgroup 404 of one of those kernel instances 402 had already completed and provided results input by at least one workgroup 404 of kernel instance 4 402(4).

Figure 4B:
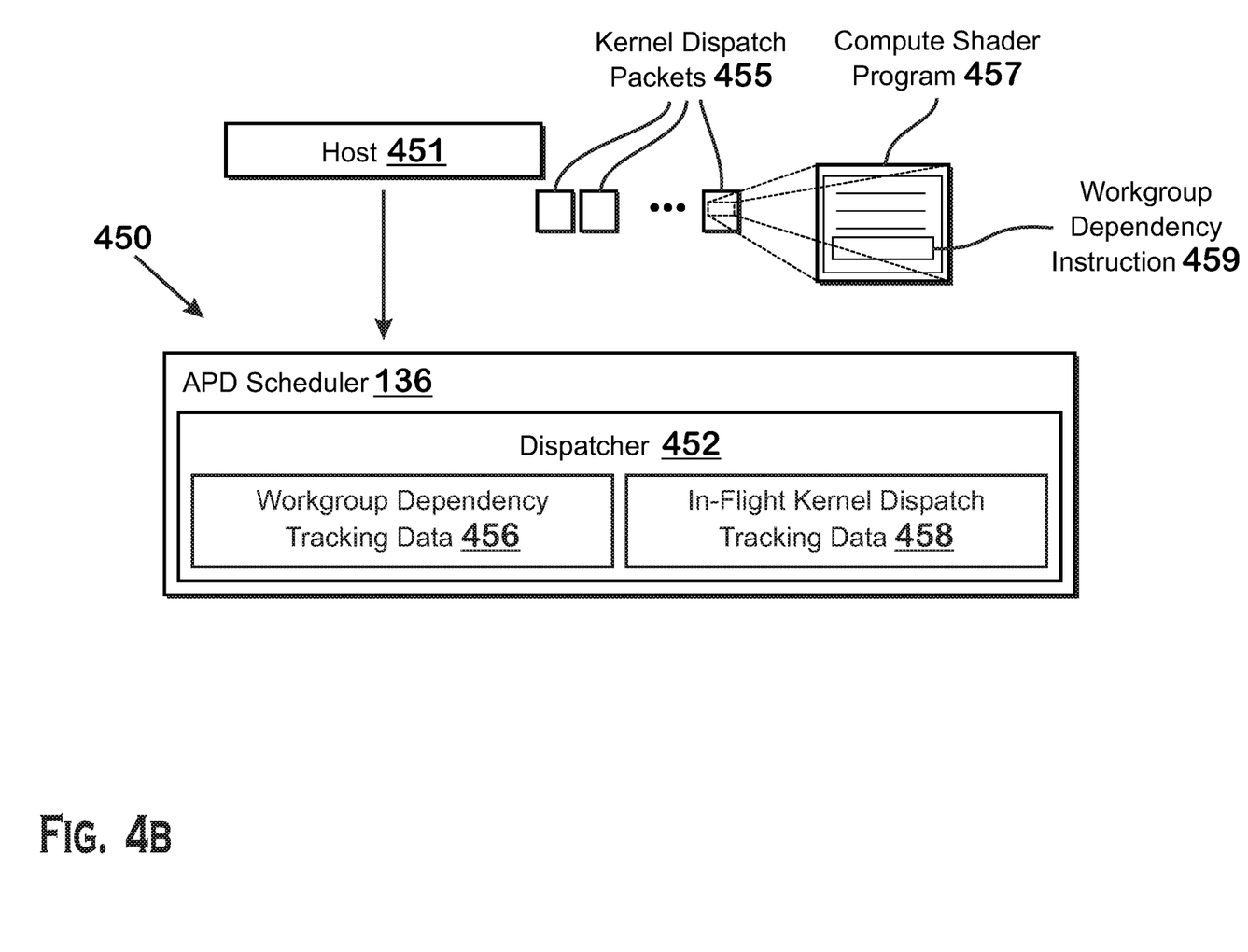
FIG. 4B illustrates a system for facilitating workgroup-level dependencies between kernel dispatches, according to an example.

FIG. 4B illustrates a system 450 for facilitating workgroup-level dependencies between kernel dispatches, according to an example. FIG. 4B illustrates the APD scheduler 136 of FIG. 2, including a dispatcher 452. The dispatcher 452 stores workgroup dependency tracking data 456 and in-flight kernel dispatch tracking data 458.

The host 451 constructs kernel dispatch packets and provides the kernel dispatch packets to the APD scheduler 136 described elsewhere herein. Each kernel dispatch packet specifies a particular kernel to execute (such as a particular compute shader program binary), as well as a size, which indicates a number of work-items the kernel dispatch is to execute with. In addition, the host 451 specifies, either as part of a kernel dispatch packet 455, or as separate, sideband information, kernel-level dependency information for the kernel dispatch packets 455. This dependency information is "kernel-level" information in that the information specifies dependencies between kernel dispatch packets 455. Kernel-level dependency information indicates that one kernel dispatch packet 455 is dependent on one or more other kernel dispatch packets 455. In an example, the dependency information specifies that a first kernel dispatch packet 455 is dependent on a second kernel dispatch packet 455. In another example, the dependency information specifies that a first kernel dispatch packet 455 is dependent on both a second kernel dispatch packet 455 and a third kernel dispatch packet 455.

A dependent kernel dispatch packet is a kernel dispatch packet for which at least one workgroup is dependent on the output of at least one workgroup of another kernel dispatch packet. In an example, a first kernel dispatch packet has at least a first workgroup. This first workgroup produces data that is consumed by a workgroup of a second kernel dispatch packet. The second kernel dispatch packet is dependent on the first kernel dispatch packet.

The APD scheduler 136 receives the kernel dispatch packets 455 from the host 451 (such as an application 126 or other entity). The APD scheduler 136 processes the kernel dispatch packets 455 to determine what workgroups 404 to dispatch to compute units 132. In general, execution of a kernel dispatch packet 455 involves dispatching the workgroups of the kernel dispatch packet 455 for execution on the compute units 132. Processing of a kernel dispatch packet 455 is complete when all workgroups of the kernel dispatch packet 455 have finished execution. A kernel dispatch is in-flight after a first workgroup for the kernel dispatch packet 455 has been dispatched for execution and before execution of all workgroups of the kernel dispatch packet 455 is complete. The dispatcher 452 maintains in-flight kernel dispatch tracking data 458, which indicates which kernel dispatch packets 455 are in-flight.

The APD scheduler 136 includes, in the in-flight kernel dispatch tracking data 458, the inter-kernel dependencies indicated by the host 451. The in-flight kernel dispatch tracking data 458 stores data indicating, for one or more kernel dispatch packets 455, the "dependent" kernel dispatch packet 455 of that kernel dispatch packet 455.

It is possible for a particular kernel dispatch packet 455 to be dependent on multiple other kernel dispatch packets 455. In some implementations, however, for any given kernel dispatch packet 455, there is at most one "dependent" kernel dispatch packet 455. In such implementations, where a first kernel dispatch packet 455 includes an indication of a "dependent" kernel dispatch packet 455, that indication indicates the kernel dispatch packet 445 that is dependent on the first kernel dispatch packet 455.

In addition to specifying a dependent kernel dispatch packet 455, some kernel dispatch packets 455 specify one or more workgroup-level dependencies. More specifically, the compute shader programs of some kernel dispatch packets 455 include a workgroup dependency instruction 459. The workgroup dependency instruction 459, executed by the workgroups of the kernel dispatch packets 455, indicates to the dispatcher 452 that a specific workgroup of the "dependent" kernel dispatch packet 455 should be dispatched by the dispatcher 452 in response to that instruction 459 being executed. The instruction 459 specifies the specific workgroup by workgroup ID. The specific workgroup is sometimes referred to herein as a "workgroup that is ready for dispatch" or a "ready-to-be-dispatched workgroup," or with another similar phrase. In some implementations, the compute unit 132 that executes a particular workgroup executes the workgroup dependency instruction 459 of that workgroup in response to all wavefronts of that workgroup being complete.

In response to the instruction, the dispatcher 452 records, in the workgroup dependency tracking data 456, the workgroup ID specified by the instruction, and associates that workgroup ID with the kernel dispatch packet that is the "dependent" kernel dispatch packet for the workgroup that executes the instruction.

The dispatcher 452 utilizes the workgroup dependency tracking data 456 to determine which workgroups to prioritize for dispatching. In general, the dispatcher 452 dispatches a workgroup for execution in response to the dispatcher 452 being "ready to dispatch another workgroup." In some implementations, the dispatcher 452 is ready to dispatch another workgroup in response to an already-dispatched workgroup completing execution. When a workgroup completes executing, resources on a compute unit 132 become available for another workgroup to be dispatched. A wide variety of scheduling techniques may be utilized by the dispatcher 452 to determine when the dispatcher 452 is ready to dispatch another workgroup.

In response to the dispatcher 452 being ready to dispatch another workgroup, the dispatcher 452 selects a kernel dispatch packet 455 from which to dispatch a workgroup. In various implementations, this kernel dispatch packet 455 selection occurs in any technically feasible manner, such as via round-robin scheduling (e.g., the dispatcher 452 cycles through the in-flight kernel dispatch packets 455), or in any other manner. In some situations, the dispatcher 452 selects a kernel dispatch packet 455 that does not have any dispatched workgroups in the APD 116 as the kernel dispatch packet 455 from which to dispatch a workgroup. In some implementations, the dispatcher 452 prioritizes kernel dispatch packets 455 for which at least one workgroup identifier is stored in the workgroup dependency tracking data 456. In other words, in some such implementations, where there is a choice between a kernel dispatch packet 455 that has no workgroup identifiers in the workgroup dependency tracking data 456 and a kernel dispatch packet 455 that does have at least one workgroup identifier in the workgroup dependency tracking data 456, the dispatcher 452 selects, as the kernel dispatch packet 455 from which to select a new workgroup for execution, the kernel dispatch packet 455 that has at least one workgroup identifier in the workgroup dependency tracking data 456.

In addition, the dispatcher 452 selects a workgroup to dispatch from the selected kernel dispatch packet 455. The dispatcher 452 prioritizes workgroups that are considered ready-to-be-dispatched over workgroups not considered ready-to-be-dispatched. More specifically, if the workgroup dependency tracking data 456 includes at least one workgroup identifier for the selected kernel dispatch packet 455, then the dispatcher 452 selects one of the included workgroups for execution, rather than a workgroup whose identifier is not included in the workgroup dependency tracking data 456. The dispatcher 452 selects between workgroups indicated in the workgroup dependency tracking data 456 according to any technically feasible scheduling policy. If the workgroup dependency tracking data 456 includes no workgroup identifiers for the selected kernel dispatch packet 455, then the dispatcher 452 selects any workgroup that has not yet been dispatched, according to any technically feasible scheduling policy.

Referring momentarily to FIG. 4A, in an example, in the event that workgroup 1 404(3-1) executes a workgroup dependency instruction 459 indicating workgroup 3 404(4-3) of kernel instance 4 402(4), the dispatcher 452 includes the identifier of workgroup 3 404(4-3) in the workgroup dependency tracking data 456. In response to the dispatcher 452 determining that a workgroup of the kernel instance 4 402(4) is ready to be dispatched, the dispatcher 452 reads the workgroup dependency tracking data 456. In an example, the dispatcher 452 determines that the identifier of workgroup 3 404(4-3) is the only identifier for kernel instance 4 402(4) in the workgroup dependency tracking data 456, and dispatches workgroup 404(4-3) for execution. In some instances, either or both of workgroup 1 404(4-1) and workgroup 2 404(4-2), which have numerically lower identifiers than workgroup 3 404(4-3), have not yet been dispatched at the time that the dispatcher 452 dispatches workgroup 3 404(4-3).

In an alternate example, multiple workgroup identifiers for kernel instance 4 402(4) are in the workgroup dependency tracking data 456 at the time that the dispatcher 452 determines that a workgroup of kernel instance 4 402(4) is ready to be dispatched. In that example, the dispatcher 452 selects a workgroup corresponding to one of those workgroup identifiers instead of a workgroup of kernel instance 4 402(4) that has not yet been dispatched and that does not have an identifier in the workgroup dependency tracking data 456. In a slightly modified example, in response to the dispatcher 452 determining that kernel instance 4 402(4) has no workgroup identifiers in the workgroup dependency tracking data 456, the dispatcher 452 selects any of the workgroups of kernel instance 4 402(4) for dispatch. In some implementations, the manner in which the dispatcher 452 selects a workgroup for dispatch when there are no workgroup identifiers for a kernel dispatch packet from which a workgroup is to be dispatched is in numerical order. In other words, in response to the dispatcher 452 selecting a kernel dispatch packet 455 from which to schedule a workgroup.

In some implementations, the host 451 utilizes software queues to provide the kernel dispatch packets 455. More specifically, the host 451 loads one or more kernel dispatch packets 455 into one or more software queues and notifies the APD 116 of such software queue updates. The software queues each store a sequence of kernel dispatch packets 455.

In some implementations, the APD scheduler 136 includes a set of hardware queues. Because there can be more software queues than hardware queues, the APD scheduler 136 periodically switches in and out software queues from the hardware queues to give the various software queues fair amounts of time.

In some implementations, kernel-level dependency information is specified through the use of barrier packets. More specifically, software queues are permitted to include barrier packets. A barrier packet defines one or more kernel dispatch packets 455 upon which an immediately subsequent kernel dispatch packet 455 depends. More specifically, the kernel dispatch packet 455 immediately after a barrier packet is indicated as being dependent on each of the kernel dispatch packets 455 specified by the barrier packet. Thus each kernel dispatch packet 455 specified by a barrier packet has, as a "dependent kernel dispatch packet 455," the kernel dispatch packet 455 immediately after the barrier packet. A barrier packet is permitted to specified kernel dispatch packets 455 in the same software queue or a different software queue.

In some implementations, the workgroup dependency tracking data 456 includes a scoreboard for each kernel dispatch packet 455 for which at least one workgroup is ready to dispatch according to an executed workgroup dependency instruction 459. Each scoreboard includes one or more entries. Each scoreboard entry includes a workgroup identifier. A scoreboard, which is associated with a kernel dispatch packet 455, thus indicates which workgroups of that kernel dispatch packet 455 are ready to be dispatched.

In some implementations, the in-flight kernel dispatch tracking data 458 includes one dispatch buffer per hardware queue. The dispatch buffer stores a dispatch buffer entry for every in-flight kernel dispatch packet of the associated hardware queue. Each dispatch buffer entry includes a pointer to a scoreboard that is associated with the kernel dispatch packet 455 of the dispatch buffer entry. This pointer allows the dispatcher 452 to discover which workgroups are to be prioritized for a kernel dispatch packet 455 when it is the turn for that kernel dispatch packet 455 to dispatch another workgroup. Each dispatch buffer entry also includes a pointer to the scoreboard for the "dependent" kernel dispatch packet 455. This pointer allows the dispatcher 452 to update the scoreboard for the dependent kernel dispatch packet 455 in response to a workgroup of the "current" kernel dispatch packet 455 executing a workgroup dependency instruction 459.

In some implementations, the workgroup dependency instruction 459 specifies the workgroup identifier of the dependent kernel dispatch packet 455 as a variable that can be modified at runtime. Thus a workgroup that includes a workgroup dependency instruction 459 is able to perform runtime operations to determine what workgroup identifier to specify.

Figure 5:
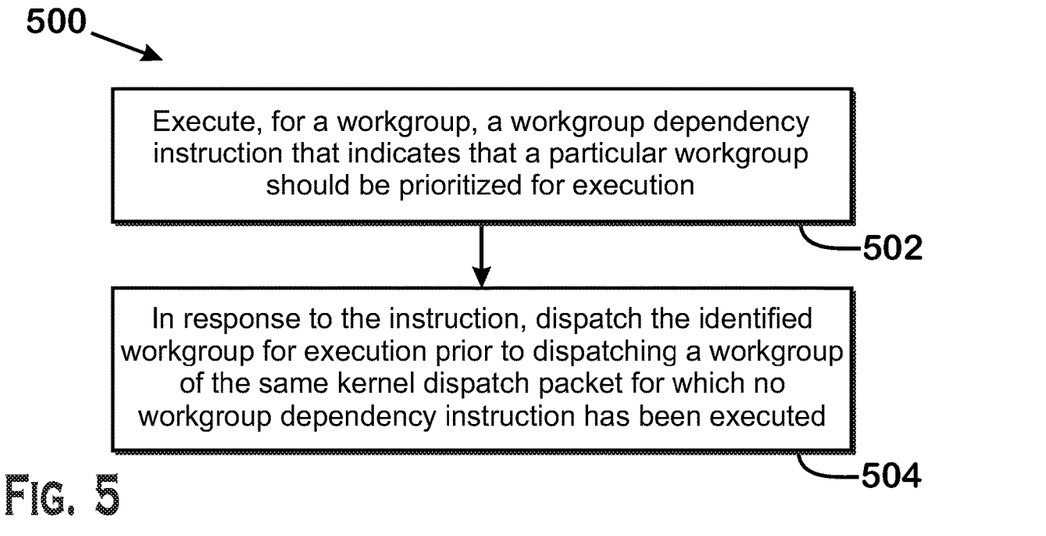
FIG. 5 is a flow diagram of a method for executing workgroups, according to an example.

FIG. 5 is a flow diagram of a method 500 for executing workgroups, according to an example. Although described with respect to the system of FIGS. 1-4B, those of skill in the art will recognize that any system, configured to perform the steps in any technically feasible order, falls within the scope of the present disclosure.

The method 500 begins at step 502, where a workgroup executes a workgroup dependency instruction 459. The workgroup dependency instruction 459 identifies a particular workgroup of a dependent kernel dispatch packet 455 as being "ready to dispatch." In some implementations, the workgroup executes the workgroup dependency instruction 459 in response to all wavefronts of the workgroup completing execution. Various techniques for specifying which kernel dispatch packet 455 is considered the dependent kernel dispatch packet 455 are disclosed herein. In some implementations, kernel dispatch packets 455 are included in one or more software queues. In these examples, barrier packets in the software queues specify which kernel dispatch packets 455 are dependent on which other kernel dispatch packets 455. In some implementations, a dispatcher 452 of an APD 116 keeps track of which workgroups have been indicated as "ready to dispatch."

At step 504, in response to the instruction, the APD 116 dispatches the identified workgroup prior to dispatching a workgroup of the same kernel dispatch packet 455 for which no workgroup dependency instruction has been executed. As described elsewhere herein, the workgroup dependency instruction 459 indicates a workgroup for which dispatch is to be prioritized. This prioritization allows workgroups from a dependent kernel dispatch packet 455 to execute before workgroups that have not yet had their dependencies satisfied. Thus the APD 116 dispatches workgroups that have been prioritized before dispatching workgroups of the same kernel dispatch packet 455 that are not prioritized.

Figure 6:
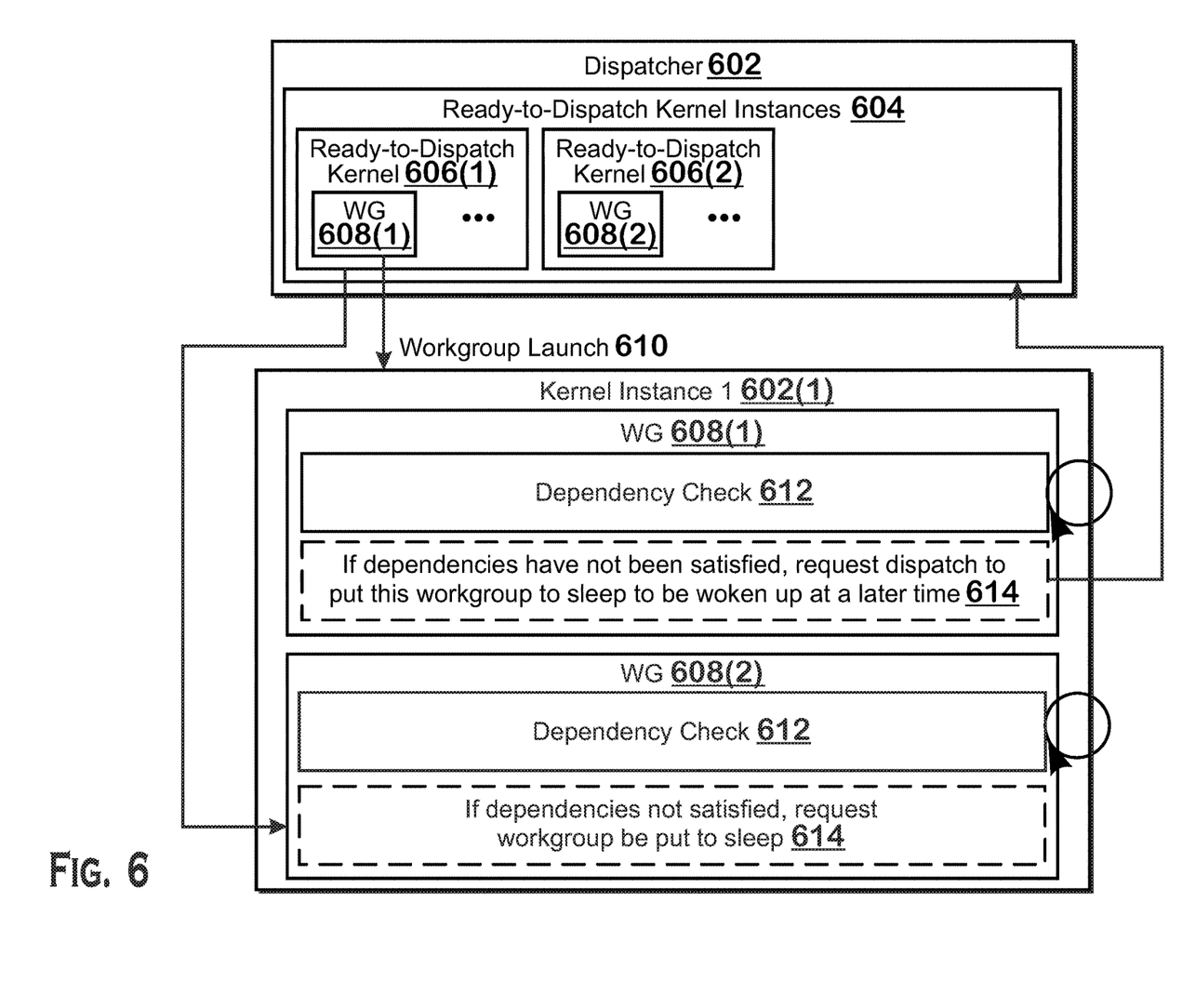
FIG. 6 presents another technique for dispatching workgroups, according to an example.

FIG. 6 presents another technique for dispatching workgroups, according to an example. In the technique of FIG. 6, a dispatcher 602 dispatches workgroups 608 (which are similar to other workgroups discussed herein, such as workgroups 404) for execution from one or more kernels 606 that are ready to dispatch. Workgroups 608 that are dispatched in this manner perform a check 612 for whether the dependencies of that workgroup 608 have been satisfied. If the dependencies of the workgroup 608 have not been satisfied, then the workgroup 608 executes an instruction 614 informing the dispatcher 602 to deschedule the workgroup 608, thus freeing the resources consumed by the workgroup 608 for another workgroup 608 to be executed.

A first kernel instance 602 is considered a ready-to-dispatch kernel instance 606 in the situation that at least one workgroup 608 from a second kernel instance upon which the first kernel instance 602 depends has completed execution. As described elsewhere herein, a first kernel instance 602 depends on a second kernel instance 602 in the situation that kernel level dependency information provided by the host 451 to the dispatcher 602 as described elsewhere herein indicates such a dependency.

In response to a workgroup 608 checking dependencies 612 and then being descheduled pursuant to the instruction 614, the dispatcher 602 is free to schedule other workgroups 608 from other ready-to-dispatch kernels 606. In some situations, the dispatcher 602 schedules another workgroup 608 from the kernel instance 602 whose workgroup was descheduled. In other situations, the dispatcher 602 schedules a workgroup 608 from a different kernel instance 602. In some implementations, the dispatcher 602 performs depth-first scheduling, scheduling workgroups 608 from the youngest kernel instances 602 before workgroups from older kernel instances 602. In other implementations, the dispatcher 602 alternates between ready-to-dispatch kernels 606 such as in a round-robin manner, or using weights based on age to favor certain ready-to-dispatch kernels 606 over other ready-to-dispatch kernels 606.

Figure 7:
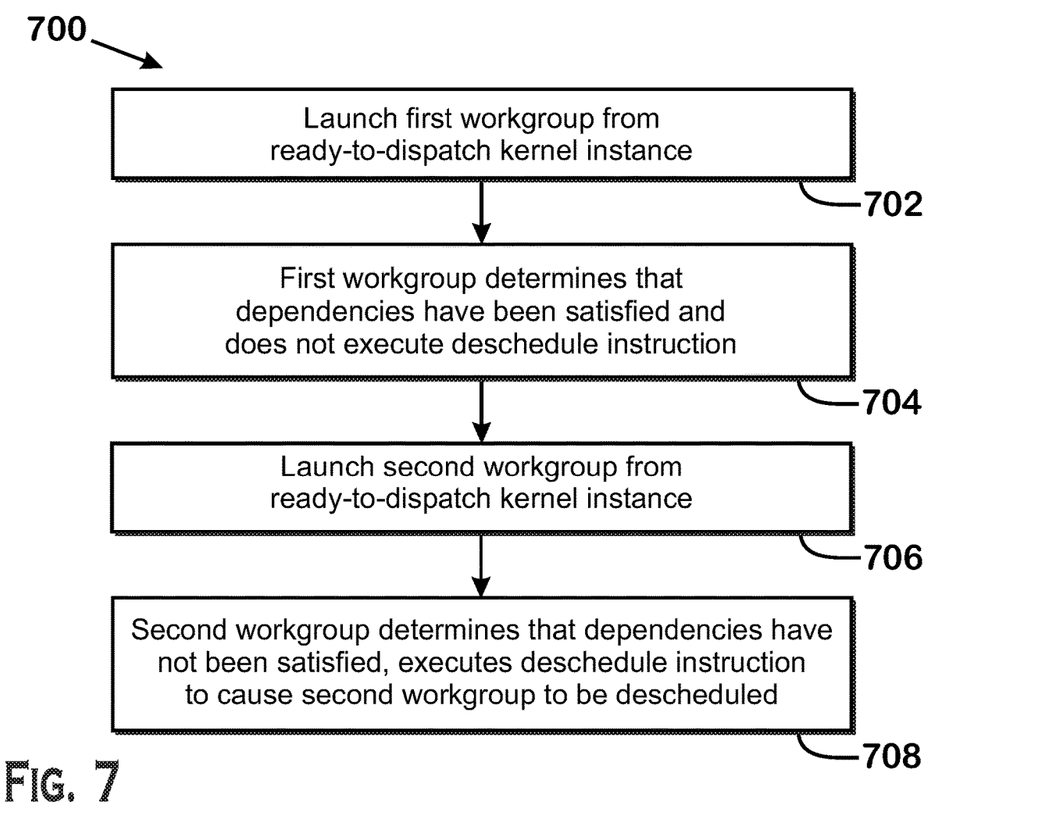
FIG. 7 is a flow diagram of a method for launching workgroups, according to an example

FIG. 7 is a flow diagram of a method 700 for launching workgroups, according to an example. Although described with respect to the system of FIGS. 1-6, those of skill in the art will recognize that any system, configured to perform the steps in any technically feasible order, falls within the scope of the present disclosure.

At step 702, a dispatcher 602 (which, in some implementations, is similar to the dispatcher 452 of FIG. 4B) launches a first workgroup from a ready-to-dispatch kernel instance 604. As stated elsewhere herein, in some implementations, a first kernel instance is a ready-to-dispatch kernel instance 604 in the situation that at least one workgroup of a second kernel instance has completed, and the kernel-level dependency information indicates that the first kernel instance is dependent on the second kernel instance. In various implementations, the dispatcher 602 dispatches workgroups from the ready-to-dispatch kernel instance 604 in any order, such as in numerical order by workgroup identifier, or in any other order. In various implementations, the dispatcher 602 selects a ready-to-dispatch kernel, from among several ready-to-dispatcher kernels, using any technically feasible arbitration scheme, such as a depth-first scheme (newer kernel instances before older kernel instances), a round-robin scheme, a weighted scheme, or any other technically feasible scheme.

At step 704, a workgroup that has been dispatched executes instructions to determine whether the dependencies of that workgroup have been satisfied, and the workgroup determines that the dependencies have been satisfied. The instructions are instructions included within the compiled code of the kernel that the workgroup is executing and, in various examples, are originally provided by a programmer, a compiler, or a driver (e.g., driver 122), but could be provided by another entity. The instructions are capable of checking whether dependencies of the workgroup have been satisfied in a custom manner. As the workgroup determines that dependencies of the workgroup have been satisfied, the workgroup does not execute a deschedule instruction to deschedule the workgroup from execution.

At step 706, the dispatcher 602 launches a second workgroup from a ready-to-dispatch kernel instance 604. The ready-to-dispatch kernel instance 604 is the ready-to-dispatch kernel instance 604 of step 702 or is a different ready-to-dispatch kernel instance 604. In some implementations, this launching is done in response to a different workgroup completing and freeing sufficient resources to launch this second workgroup.

At step 708, the second workgroup executes the instructions to determine whether dependencies have been satisfied. As with the first workgroup, such instructions are included within the kernel for which the second workgroup is launched and can be specified in any technically feasible manner. In step 708, these instructions, when executed, determine that the second workgroup has not had dependencies satisfied. In response to this determination, the second workgroup executes an instruction to deschedule the second workgroup. The dispatcher 602 deschedules the second workgroup and performs other steps such as scheduling other workgroups for execution.

Each of the units illustrated in the figures represent hardware circuitry configured to perform the operations described herein, and certain units of the graphics processing pipeline 300 are programmable and can thus execute programs.

In some implementations, the techniques described herein are implemented across multiple chiplets. A chiplet is a specific individual physical chip that includes components such as compute units 132 and a dispatcher. Each dispatcher is able to schedule and dispatch workgroups as described herein. In an example, in response to a workgroup executing an instruction informing a dispatcher that a subsequent workgroup from a dependent kernel is ready to execute, this workgroup notifies the dispatcher on the chiplet that is configured to spawn workgroups from the dependent kernel. That dispatcher then schedules workgroups from that kernel for execution.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for executing workgroups, the method comprising:
    executing, for a first workgroup of a first kernel dispatch derived from a first software queue, a workgroup dependency instruction that includes an indication to prioritize execution of a second workgroup of a second kernel dispatch derived from the first software queue; and
    in response to the workgroup dependency instruction, dispatching the second workgroup of the second kernel dispatch prior to dispatching a third workgroup of the second kernel dispatch,
    wherein no workgroup dependency instruction including an indication to prioritize execution of the third workgroup has been executed.

2. The method of claim 1, wherein:
    the executing occurs in response to all wavefronts of the first workgroup completing execution.

3. The method of claim 1, wherein the second kernel dispatch is dependent on the first kernel dispatch.

4. The method of claim 3, wherein a barrier packet indicates that the second kernel dispatch is dependent on the first kernel dispatch.

5. The method of claim 1, wherein dispatching the second workgroup occurs prior to dispatching any workgroup of the second kernel dispatch for which no workgroup dependency instruction has been executed.

6. The method of claim 1, further comprising:
    setting, at runtime, a workgroup identifier specifying the second workgroup, by the first workgroup.

7. The method of claim 1, wherein:
    the first kernel dispatch is derived from a first software queue and the second kernel dispatch is derived from a second software queue.

8. A method for executing workgroups, the method comprising:
    executing, for a first workgroup of a first kernel dispatch, a workgroup dependency instruction that includes an indication to prioritize execution of a second workgroup of a second kernel dispatch, wherein the second kernel dispatch is dependent on the first kernel dispatch and a third kernel dispatch; and
    in response to the workgroup dependency instruction, dispatching the second workgroup of the second kernel dispatch prior to dispatching a third workgroup of the second kernel dispatch,
    wherein no workgroup dependency instruction including an indication to prioritize execution of the third workgroup has been executed.

9. A device, comprising:
    a compute unit circuitry; and
    a dispatcher circuitry;
    wherein the compute unit circuitry is configured to execute, for a first workgroup of a first kernel dispatch derived from a first software queue, a workgroup dependency instruction that includes an indication to prioritize execution of a second workgroup of a second kernel dispatch derived from the first software queue; and
    wherein the dispatcher circuitry is configured to, in response to the workgroup dependency instruction, dispatch the second workgroup of the second kernel dispatch prior to dispatching a third workgroup of the second kernel dispatch,
    wherein no workgroup dependency instruction including an indication to prioritize execution of the third workgroup has been executed.

10. The device of claim 9, wherein:
    the executing occurs in response to all wavefronts of the first workgroup completing execution.

11. The device of claim 9, wherein the second kernel dispatch is dependent on the first kernel dispatch.

12. The device of claim 11, wherein a barrier packet indicates that the second kernel dispatch is dependent on the first kernel dispatch.

13. The device of claim 9, wherein dispatching the second workgroup occurs prior to dispatching any workgroup of the second kernel dispatch for which no workgroup dependency instruction has been executed.

14. The device of claim 9, wherein the compute unit circuitry is configured to:
set, at runtime, a workgroup identifier specifying the second workgroup, by the first workgroup.

15. The device of claim 9, wherein:
the first kernel dispatch is derived from a first software queue and the second kernel dispatch is derived from a second software queue.

16. A device, comprising:
a compute unit circuitry; and
a dispatcher circuitry;
wherein the compute unit circuitry is configured to execute, for a first workgroup of a first kernel dispatch, a workgroup dependency instruction that includes an indication to prioritize execution of a second workgroup of a second kernel dispatch, wherein the second kernel dispatch is dependent on the first kernel dispatch and a third kernel dispatch; and
wherein the dispatcher circuitry is configured to, in response to the workgroup dependency instruction, dispatch the second workgroup of the second kernel dispatch prior to dispatching a third workgroup of the second kernel dispatch,
wherein no workgroup dependency instruction including an indication to prioritize execution of the third workgroup has been executed.

* * * * *